(12) United States Patent
Sudo

(10) Patent No.: US 8,295,004 B2
(45) Date of Patent: Oct. 23, 2012

(54) METHOD AND APPARATUS FOR MEASURING DISK RUNOUT IN A DISK DRIVE

(75) Inventor: Daisuke Sudo, Ome (JP)

(73) Assignee: Kabushiki Kaisha Toshiba (JP)

( * ) Notice: Subject to any disclaimer, the term of this patent is extended or adjusted under 35 U.S.C. 154(b) by 142 days.

(21) Appl. No.: 12/868,644

(22) Filed: Aug. 25, 2010

(65) Prior Publication Data

US 2011/0141617 A1    Jun. 16, 2011

(30) Foreign Application Priority Data

Dec. 16, 2009   (JP) ................................. 2009-285424

(51) Int. Cl.
*G11B 5/596* (2006.01)

(52) U.S. Cl. ..................................................... 360/77.04

(58) Field of Classification Search ........................ None
See application file for complete search history.

(56) References Cited

U.S. PATENT DOCUMENTS

| | | | |
|---|---|---|---|
| 5,541,784 A | | 7/1996 | Cribbs et al. |
| 5,818,803 A | | 10/1998 | Nakamura et al. |
| 5,995,316 A | * | 11/1999 | Stich ........................... 360/77.04 |
| 6,023,390 A | * | 2/2000 | Kang ........................... 360/77.04 |
| 6,128,153 A | | 10/2000 | Hasegawa et al. |
| 6,411,461 B1 | * | 6/2002 | Szita ............................ 360/77.04 |
| 6,437,936 B1 | * | 8/2002 | Chen et al. .................. 360/77.04 |
| 6,798,611 B1 | * | 9/2004 | Romano et al. ............. 360/77.04 |
| 6,898,047 B2 | * | 5/2005 | Shishida et al. ............ 360/77.04 |
| 7,106,547 B1 | * | 9/2006 | Hargarten et al. .......... 360/77.04 |
| 7,315,430 B2 | * | 1/2008 | Kisaka ......................... 360/77.04 |
| 7,489,468 B2 | * | 2/2009 | Ohinata et al. .............. 360/77.04 |
| 8,094,405 B1 | * | 1/2012 | Ying et al. ................... 360/77.04 |
| 2005/0201003 A1 | * | 9/2005 | Shishida et al. ............ 360/77.04 |

FOREIGN PATENT DOCUMENTS

| | | |
|---|---|---|
| JP | 08-263952 A | 10/1996 |
| JP | 09-128915 A | 5/1997 |
| JP | 09-330571 A | 12/1997 |
| JP | 10-021662 A | 1/1998 |
| JP | 2001-332045 | 11/2001 |
| JP | 2008-034067 | 2/2008 |

OTHER PUBLICATIONS

Information Sheet in 2 pages.
Notification of Reasons for Rejection mailed by Japan Patent Office on Dec. 14, 2010 in the corresponding Japanese patent application No. 2009-285424.

* cited by examiner

*Primary Examiner* — Hoa T Nguyen
*Assistant Examiner* — James L Habermehl
(74) *Attorney, Agent, or Firm* — Knobbe, Martens, Olson & Bear LLP

(57) ABSTRACT

According to one embodiment, a disk drive includes an actuator, a servo controller, a calculation module and an adjustment module. The actuator is configured to move the head over a disk, in the radial direction of the disk. The servo controller is configured to make the head move along a target orbit on the disk, in accordance with the distance the actuator has been moved. The calculation module is configured to calculate, as disk runout, a virtual target orbit value supplied to the servo controller to suppress the disturbance at the target orbit. The adjustment module is configured to multiply the virtual target orbit value by a gain that has been preset.

20 Claims, 9 Drawing Sheets

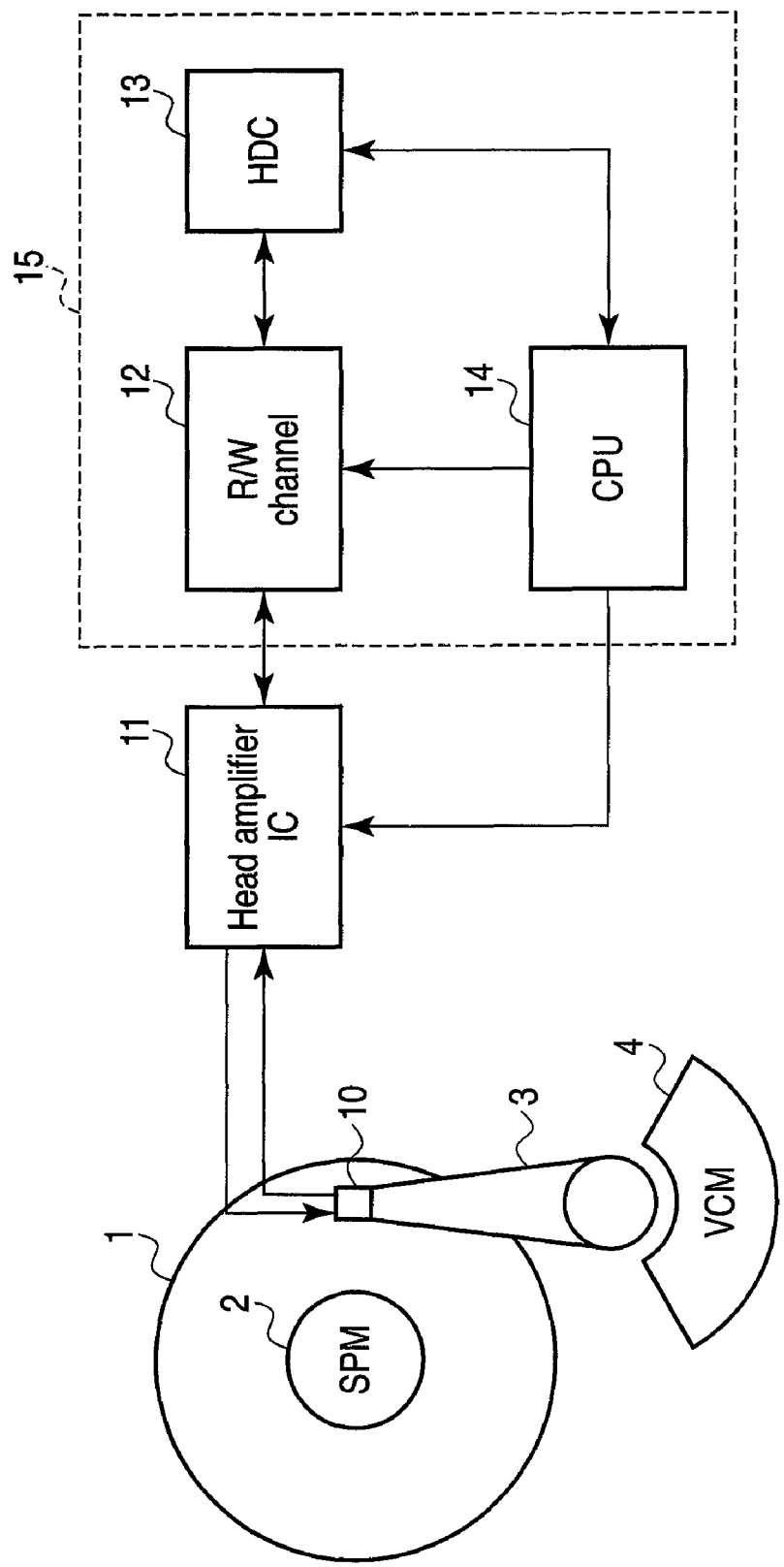
F I G. 1

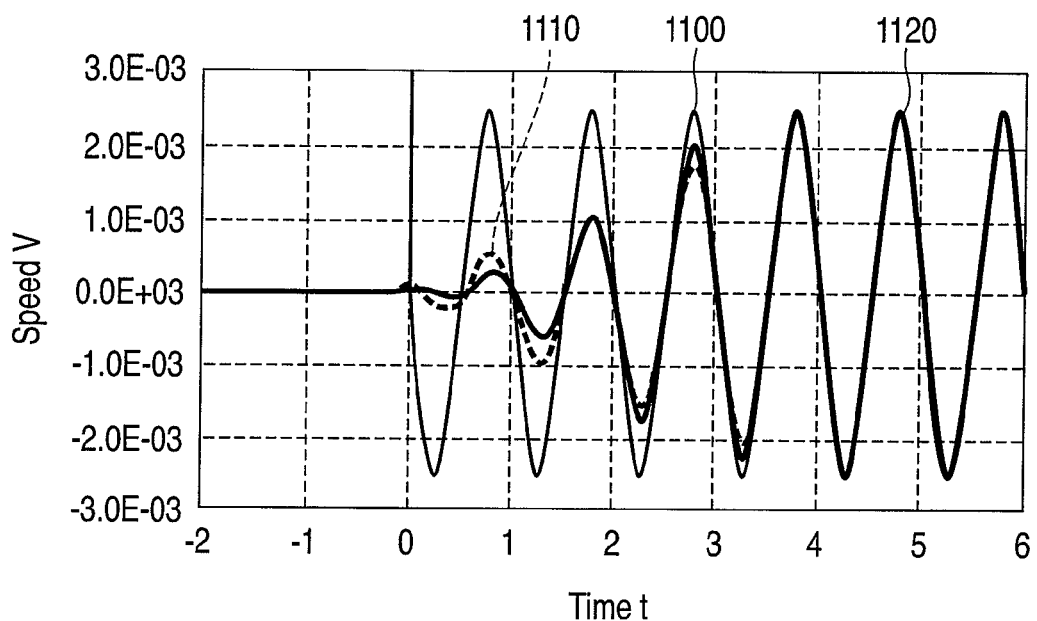
F I G. 11
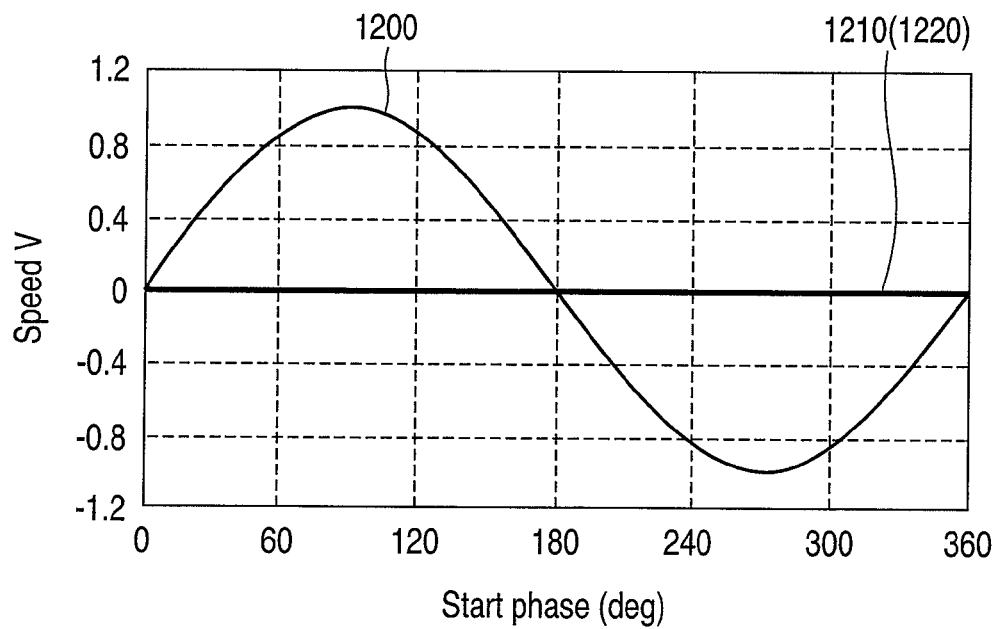
F I G. 12

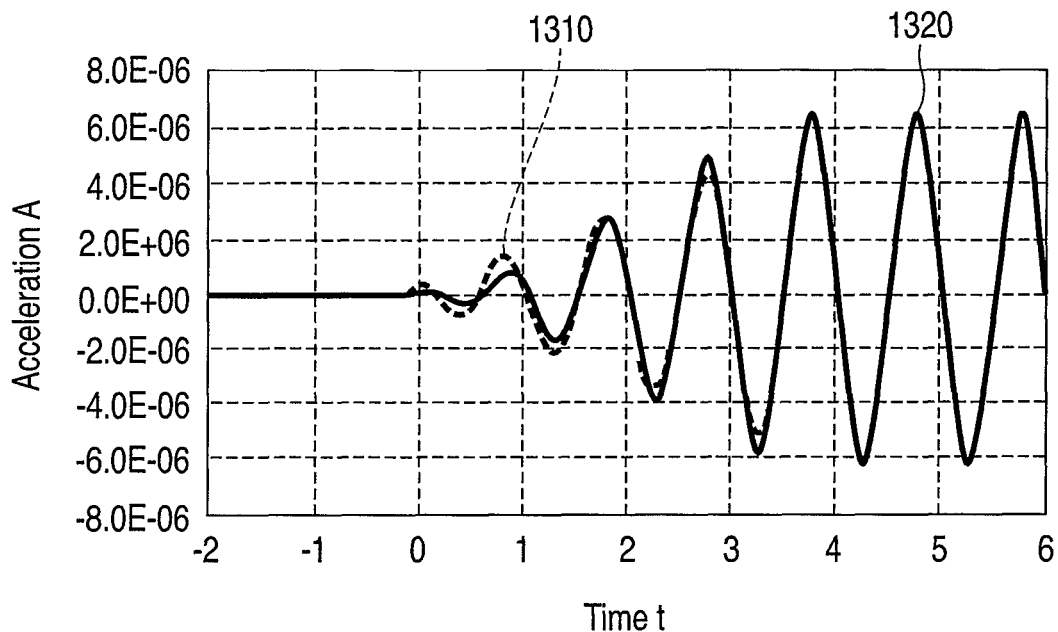
F I G. 13
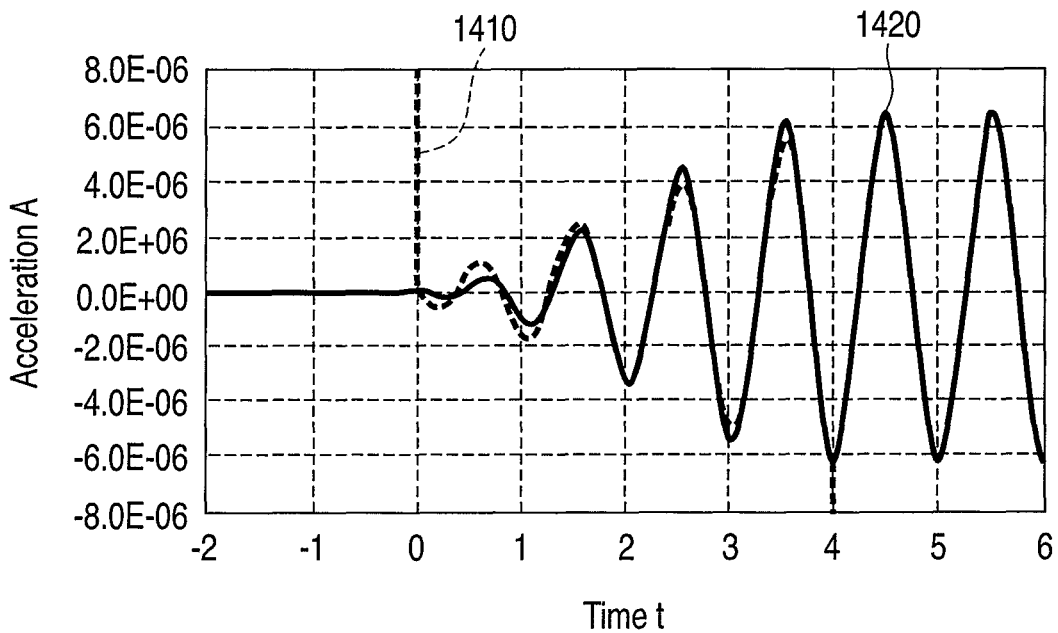
F I G. 14

METHOD AND APPARATUS FOR MEASURING DISK RUNOUT IN A DISK DRIVE

CROSS-REFERENCE TO RELATED APPLICATIONS

This application is based upon and claims the benefit of priority from Japanese Patent Application No. 2009-285424, filed Dec. 16, 2009; the entire contents of which are incorporated herein by reference.

FIELD

Embodiments described herein relate generally to a technique of measuring the disk runout of a disk incorporated in a disk drive.

BACKGROUND

In most disk drives, a representative example of which is the hard disk drive, a magnetic head (hereinafter referred as "head") records and reproduce data on the from a disk that is a magnetic recording medium. In the disk drive, the disk is secured to the shaft of a spindle motor and can be rotated by the spindle motor (SPM).

In the disk drive of such a structure, the disk may undergo a phenomenon called disk runout, because of, for example, the error in positioning the spindle motor. If the disk runout occurs, the servo track (servo cylinder) will deviate from the rotational orbit around the rotational center of the disk (i.e., rotational center of the SPM). (Thus, so-called "servo track runout occurs.) The disk runout results in dynamic offset (DO), changing the read/write (R/W) offset as the disk rotates once.

In the disk drive, the head has a read head and a write head, which are spaced apart from each other. Since the read head and the write head are separated from each other, an offset (positional displacement) of a specific value exists between the track loci of the read head and write head in the radial direction of the disk. This offset shall hereinafter be referred to as "R/W offset."

The disk drive has a servo control function of performing write dynamic offset control (WDOC) for controlling the dynamic offset. The write dynamic offset control adjusts the R/W offset value at the time of writing data to the disk. In order to perform the WDOC appropriately, the value of disk runout (hereinafter referred to, when necessary, as "runout value" or "runout data") must be measured with high precision and the data representing this value must be stored in a memory or the disk. Methods of measuring the runout value have hitherto been proposed (see, for example, Jpn. Pat. Appln. KOKAI Publications Nos. 9-128915 and 9-330571).

In the method disclosed in the prior-art documents specified above, a servo signal is read and the runout is measured while the head remains physically stopped and stored in a memory in the form of a runout correction table. The controller uses the runout value in the table, correcting the position of the head. The head can thereby write data to a data track truly circular around the rotational center of the disk. The methods disclosed in the above-identified documents are designed to generate and store rotational locus servo data that controls the head, causing the same to move along its rotational locus, relative to the disk that keep rotating. The controller controls the head in accordance with the rotational locus servo data.

The method disclosed in the above-identified documents corrects the runout, by using the runout data obtained by measuring the runout in an inner-periphery push scheme or a servo-free scheme. The head is thereby controlled to move along a truly circular locus, with respect to the disk.

In the inner-periphery push scheme, the actuator (i.e., carriage holding the head) is pushed to the stopper provided at the inner periphery of the disk. In this state, the head reads the servo data (position data), thereby measuring the disk runout. However, the method is disadvantageous in that fine dust particles are made (this event is known as "contamination") as the actuator is pushed onto the stopper every time the drive is activated. The dust particles may adversely influence the disk drive. In view of this, the method needs improvement to be utilized in practice.

In the servo-free scheme, the current of a specific value is supplied to the voice coil motor (VCM) of the actuator, by means of feed-forward control. At this point, the servo data (position data) is read, thereby calculating the runout value. This method, however, can hardly achieve stable measuring of the runout if disturbance occurs, because the head position deviates in the radial direction of the disk.

BRIEF DESCRIPTION OF THE DRAWINGS

A general architecture that implements the various feature of the embodiments will now be described with reference to the drawings. The drawings and the associated descriptions are provided to illustrate the embodiments and not to limit the scope of the invention.

FIG. 1 is a block diagram explaining the configuration of a disk drive according to an embodiment;

FIG. 11 is a diagram showing another speed characteristic observed in the servo control according to the embodiment;

FIG. 12 is a diagram showing still another speed characteristic observed in the servo control according to the embodiment;

FIG. 13 is a diagram showing an acceleration characteristic observed in the servo control according to the embodiment;

FIG. 14 is a diagram showing another acceleration characteristic observed in the servo control according to the embodiment;

DETAILED DESCRIPTION

Figure 2:
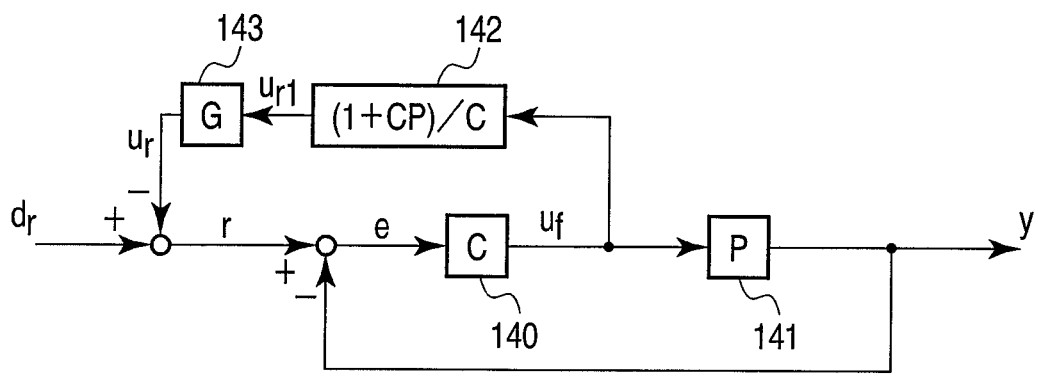
FIG. 2 is a block diagram of a servo control model according to the embodiment.

Various embodiments will be described hereinafter with reference to the accompanying drawings.

In general, according to one embodiment, a disk drive includes an actuator, a servo controller, a calculation module and an adjustment module. The actuator is configured to move the head over a disk, in the radial direction of the disk. The servo controller is configured to make the head move along a target orbit on the disk, in accordance with the distance the actuator has been moved. The calculation module is configured to calculate, as disk runout, a virtual target orbit value supplied to the servo controller to suppress the disturbance at the target orbit. The adjustment module is configured to multiply the virtual target orbit value by a gain that has been preset.

(Configuration of the Disk Drive)

As shown in FIG. 1, a disk drive according to this embodiment a magnetic disk drive that has a disk 1 and a head 10. The disk 1 is a perpendicular magnetic recording medium. The disk 1 is secured to a spindle motor (SPM) 2, and can be rotated. The head 10 is mounted on an actuator 3 and can move over the disk 1 in the radial direction thereof. The actuator 3 is rotated by a voice coil motor (VCM) 4. The head 10 is so constructed that a write head and a read head are spaced apart from each other. The write head is configured to write data to the disk 10. The read head is configured to read data from the disk 10.

The disk drive further has a head amplifier integrated circuit (hereinafter referred to as "head amplifier IC") 11, a read/write channel (R/W channel) 12, a disk controller (HDC) 13, and a microprocessor (CPU) 14. The R/W channel 12, HDC 13 and CPU 14 are incorporated in a one-chip integrated circuit 15.

The head amplifier IC 11 receives a write signal (write current) from the R/W channel 12 and corresponding to write data, and supplies the write signal to the head 10. The head amplifier IC 11 further receives a read signal output from the head 10, and amplifies the read signal and sends the same to the R/W channel 12.

The R/W channel 12 is a signal processing circuit configured to encode the write data transferred from the disk controller 13, into write data, which is output to the head amplifier IC 11. The write data is to be recorded on the disk 1. The R/W channel 12 is also configured to decode the read data output from the magnetic head 10 into read data, which is output to the disk controller 13.

The disk controller 13 constitutes an interface between the disk drive and a host system (not shown) such as a personal computer, and controls the transfer of read data and write data. The CPU 14 is the main controller of the disk drive and performs servo control for controlling the read/write process and positioning of the head 10. The CPU 14 measures the disk runout and performs dynamic offset control (DOC). DOC includes write dynamic offset control (WDOC).

(Disk Runout)

Figure 3:
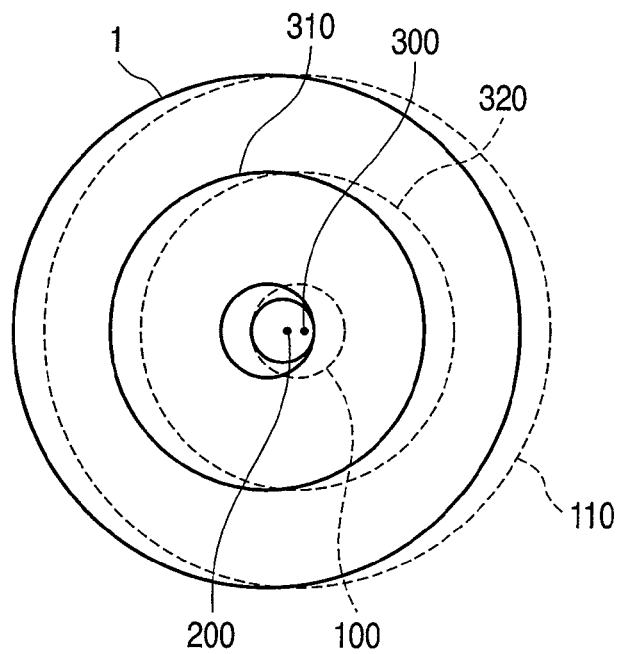
FIG. 3 is a diagram explaining a disk runout, in connection with the embodiment.

FIG. 3 is a diagram concerned with a disk runout measuring method according to this embodiment, and explaining a phenomenon known as "disk runout."

It should be noted first that a disk runout occurs when the disk 1 is secured to the SPM 2, because of the gap between the inner periphery of the disk 1 and the shaft of the SPM 2. Most desirably, the disk 1 must have a servo track 310 that is exactly concentric to the rotational center 200 of the SPM 2, as indicated by a solid line in FIG. 3. The servo track 310 is a track (cylinder) extending in the circumferential direction of the disk 1, with respect to the servo track holding the servo data. On the disk 1, many other servo tracks 310 are formed, which are spaced apart in the radial direction of the disk 1.

If a runout occurs, a point 300 deviating from the rotational center 200 becomes the center of the servo tracks. The distance between the rotational center 200 and the point 300 is the runout value.

In most disk drives, if the disk 1 undergoes disk runout, DO takes place, changing the R/W offset every time the disk 1 rotates. The CPU 14 therefore performs WDOC to adjust the R/W offset before data is written to the disk 1. To perform appropriate WDOC, the disk runout must be measured with high precision.

After the disk drive has been shipped as a product, the disk runout may result in a disk shift, particularly while the power switch of the disk drive remains off. To prevent the disk shift, it is necessary to measure the disk runout when the drive is activated, thereby to update the disk runout data that is used to determine whether a disk shift has taken place. Therefore, in most disk drives, the disk runout data (disk runout value) measured during the manufacture of the drive is stored in the flash memory or the disk incorporated in the disk drive.

(Servo Control)

FIG. 2 is a block diagram of a servo control model the CPU 14 performs in the present embodiment.

The servo control model is composed of a feedback control model and a feedforward control model. The feedback control model is of ordinary type. The feedforward control model accords with this embodiment and is related to disk runout.

The feedback control model has a controller 140 and a plant 141. The controller 140 is a compensator (transfer function C) and is, in practice, the CPU 14. The controller 140 receives the data representing the positioning error e of the head 10 and calculates a control value Uf that will be used to eliminate the positioning error e. The plant 141 is a control object (transfer function P), and is the VCM 4. The plant 141 is driven and controlled in accordance with the control value Uf.

In the feedback control model, a control value y (here, the position data about the head 10), which is the output of the plant 141, is fed back to. The input to the feedback control model represents the target position (target orbit) r for the head 10. The positioning error e is, therefore, the difference between the target position r and the control value y fed back to the input of the controller 140.

The feed forward model of this embodiment has a controller (hereinafter called "disk runout controller") 142 and a gain adjuster 143. The disk runout controller 142 is configured to suppress the disturbance that accords with the disk runout. The disk runout controller 142 is a compensator that holds a transfer function ((1+CP)/C), and receives the control value Uf and outputs a virtual target-orbit value Ur1. The gain adjuster 143 multiplies the virtual target-orbit value Ur1 by a preset gain G, calculating a virtual target orbit Ur, which has been gain-adjusted as disturbance control input value (correction value).

In this embodiment, the feedback control model is designed to apply a first-order sine wave as disturbance dr to the target position r as shown in FIG. 2, if a disk runout takes place. The disk runout controller 142 calculates, as disk runout value, the virtual target-orbit value Ur1 obtained when the primary component of the control value Uf the controller 140 calculates becomes zero. Hence, it is necessary to determine the condition that changes the primary component of the control value Uf to zero. In the servo control model, the disturbance dr to the target orbit (target position) can be calculated, using the following equation:

$$dr = \frac{1+CP}{C}Uf \qquad (1)$$

The disk runout controller 142 can calculate the virtual target-orbit value Ur1, as a runout extracted by performing discrete Fourier transformation on the primary component of disturbance dr. Note that the plant 141 has characteristics deviating from the design values. It is therefore desired that a nominal model of the plant should perform a feedback control, thereby converging the control value Uf to zero and calculating the disk runout value.

(Dynamic Offset Control)

Figure 4:
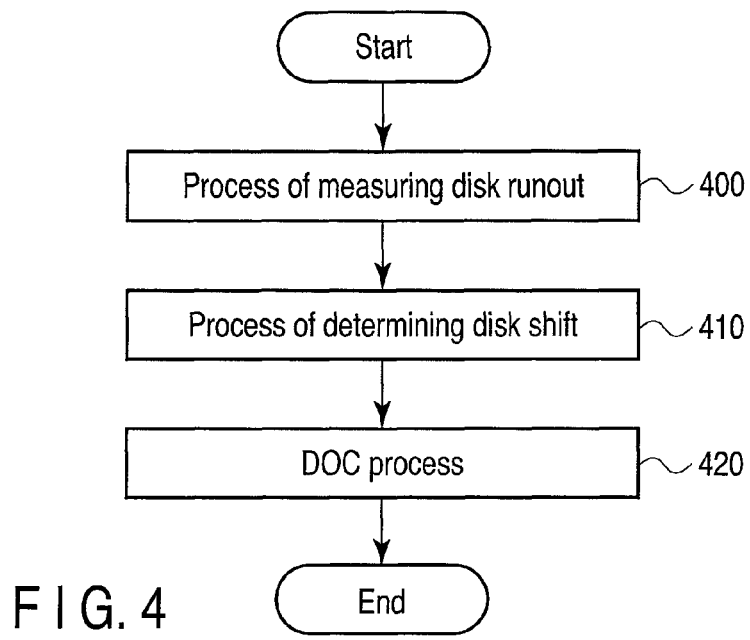
FIG. 4 is a flowchart explaining the sequence of DOC performed in the embodiment.

FIG. 4 is a flowchart explaining the sequence of the dynamic offset control the CPU 14 performs.

After measuring the disk runout (Block 400) and determining the disk shift (Block 410), the CPU 14 performs dynamic offset control (DOC) (Block 420). Note that the disk runout is measured by a method according to this embodiment (called "virtual concentric servo-control method," for convenience).

Figure 5:
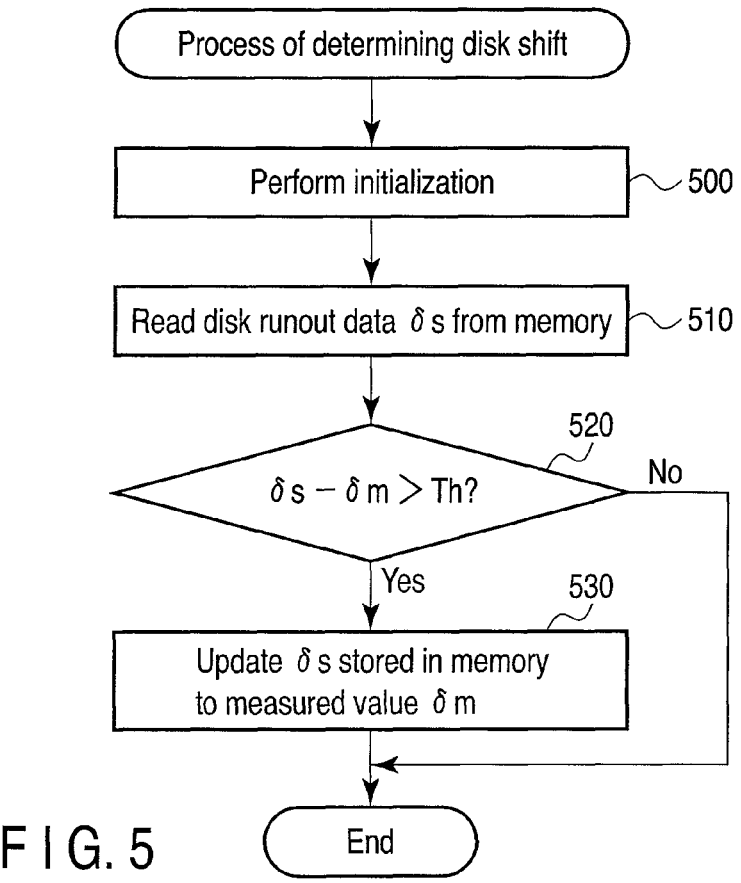
FIG. 5 is a flowchart explaining a sequence of determining a disk shift in the embodiment.

The disk shift is determined as will be explained with reference to the flowchart of FIG. 5. As shown in FIG. 5, whether the disk runout has resulted in a disk shift outside a tolerance range. More precisely, the CPU 14 performs initialization, setting a threshold value Th used as reference value of decision (Block 500). The CPU 14 then reads the disk runout data δs from the disk or the flash memory (hereinafter, collectively called "memory") (Block 510). The disk runout data δs represents the disk runout measured during the manufacture of the drive.

The CPU 14 determines whether the difference between the existing disk runout data δs and the disk runout data δm representing the disk runout measured (Block 520). If the difference exceeds the threshold value Th, the CPU 14 determines that the disk shift falls outside the tolerance range, and updates the disk runout data, updating the existing disk runout data δs to disk runout data δm in the memory) (Block 530). If the disk shift falls within the tolerance range, the disk runout data (s is, of course, maintained unchanged in the memory.

The CPU 14 uses the disk runout data (either δs or δm) stored in the memory, accomplishing the DOC process and positioning the head 10 at the target position (target track or target cylinder) provided on the disk 1, while performing the servo control on the head 10 that is writing or reading data to or from the disk 1. That is, for example, before the head 1 writes data to the disk 1, the CPU 14 performs WDOC to adjust the R/W offset value, positioning the head 10 at the target track in which the head 10 will record data.

(Process of Measuring the Disk Runout)

Figure 6:
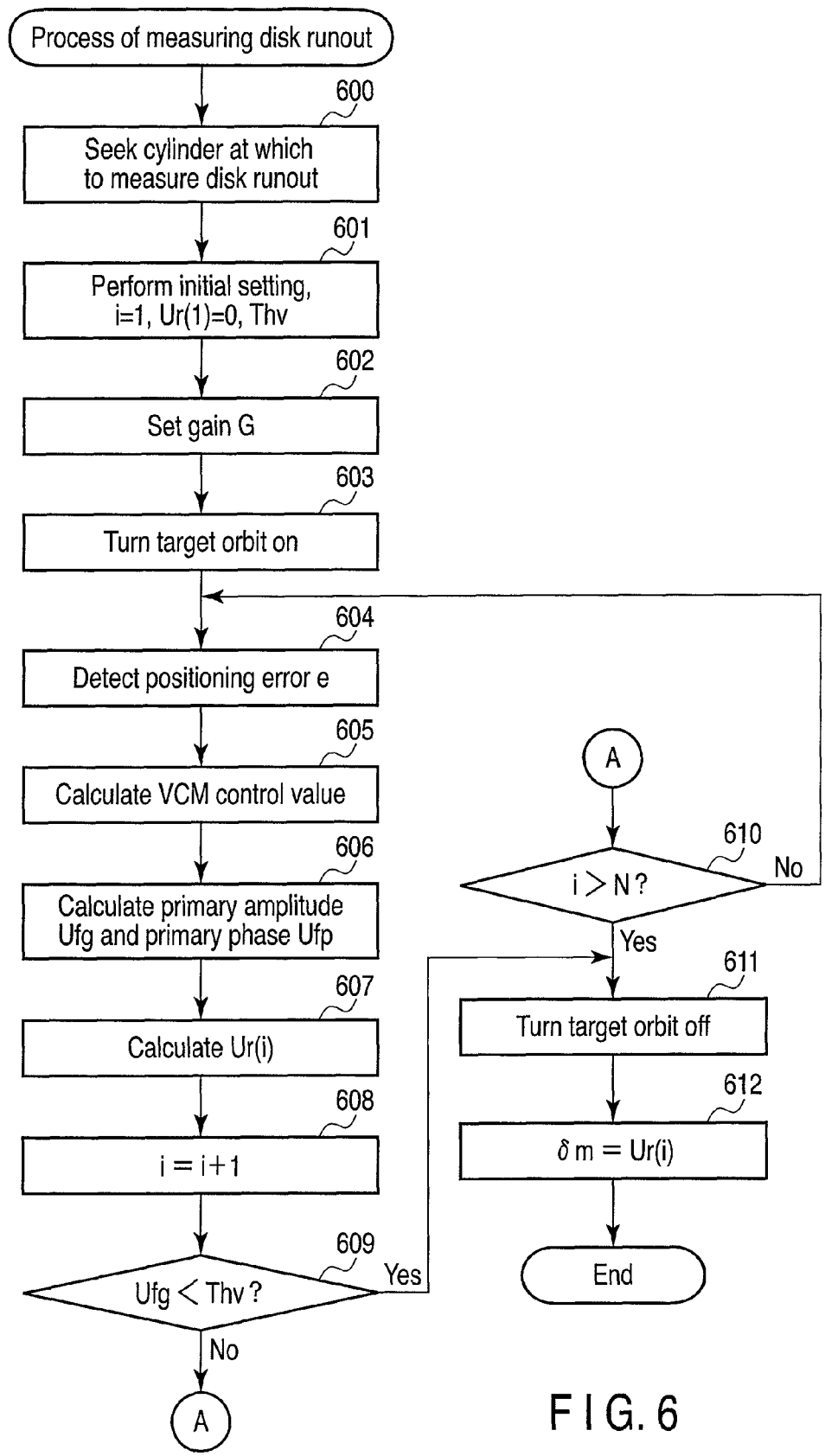
FIG. 6 is a flowchart explaining the sequence of measuring a disk runout in the embodiment.

The process of measuring the disk runout by performing the virtual concentric servo-control method according to this embodiment will be explained with reference to the flowchart of FIG. 6.

First, the CPU 14 causes the head 10 to seek the track of which to measure the disk runout (Block 600). That is, the CPU 14 performs the feedback control in the servo control model of FIG. 2. Then, the CPU 14 initializes variables (i, Ur and threshold value Thy) (Block 601). At this point, the CPU 14 sets gain G in the gain adjuster 143 (Block 602).

Next, the CPU 14 sets the virtual target orbit Ur to zero, thus initializing this variable. The CPU 14 further turns on the disk runout controller 142, thereby validating the virtual target orbit (Block 603). The CPU 14 then performs the feedback control, detecting the positioning error e (Block 604). The CPU 14 calculates a control value (VCM control value) Uf (Block 605). The control value Uf is output from the controller 140 to the plant 141 (VCM 4). The plant 141 is thereby driven and controlled. That is, the actuator 3 moves the head 10 to the track of which to measure the disk runout.

The CPU 14 receives the control value Uf from the feedback control model and inputs the same to the disk runout controller 142. On receiving the control value Uf, the disk runout controller 142 performs a DFT calculation process, calculating the primary amplitude Ufg and primary phase Ufp of the control value Uf (Block 606). Next, the CPU 14 causes the disk runout controller 142 to use the control value Uf, calculating a virtual target orbit value Ur(i) that does not accord with the disk runout, as indicated by the following equation (2) (Block 607). Note that the disk runout controller 142 calculates a virtual target orbit Ur1(i) not applied with gain G yet.

$$Ur(i+1) = G\left\{\frac{1+CP}{C}Uf - Ur(i)\right\} \qquad (2)$$

At this point, the CPU 14 compares the primary component threshold value Thv of the control value with the primary amplitude Ufg (Blocks 608 and 609). If the control value has not converted to zero, the CPU 14 determines that the disk runout has not been correctly measured (NO in Block 609), and measures the disk runout again (Block 610). In this case, the last disk runout measured is set as virtual target orbit Ur to measure the measure the disk runout over again. The CPU 14 repeats the sequence of Blocks 604 to 610 until the primary component of the control value Uf becomes less than the threshold value Thy.

When the primary component of the control value Uf approaches zero, the CPU 14 turns off the disk runout controller 142, invalidating the virtual target orbit (block 611). When the virtual target orbit is thus invalidated, the control is switched from the feedback control to the servo control for the runout track. The CPU 14 stores the runout data thus obtained (i.e., virtual target orbit value Ur(i)), as variable δm, in the memory for some time (Block 612). Note that the CPU 14 stores the disk runout data δm in the memory (or in disk 1) if a disk shift outside the tolerance range is detected as shown in FIG. 5.

Generally, a low-pass filter (LPF) is used in servo control, in order to ensure continuity for the target orbit. If an LPF is used, however, a phase delay will occur, as is known in the art. In the process of measuring the disk runout, performed in this embodiment, the virtual target orbit Ur may be used in the feedback control to change the target orbit r if the disk runout is excessively large. In this case, however, the servo control may no longer be possible. If a LPF is used to prevent this, a phase delay will occur, making a correct virtual concentric servo control impossible.

Hence, in this embodiment, the gain adjuster 143 multiples the virtual target-orbit value Ur1 the disk runout controller 142 has calculated, by gain G, outputting the data representing the virtual target orbit value Ur(i) that has been gain-adjusted (Blocks 602 and 607). As a result, the target orbit r for the feedback control can be changed without jeopardizing the servo control that maintains the phase.

Figure 7:
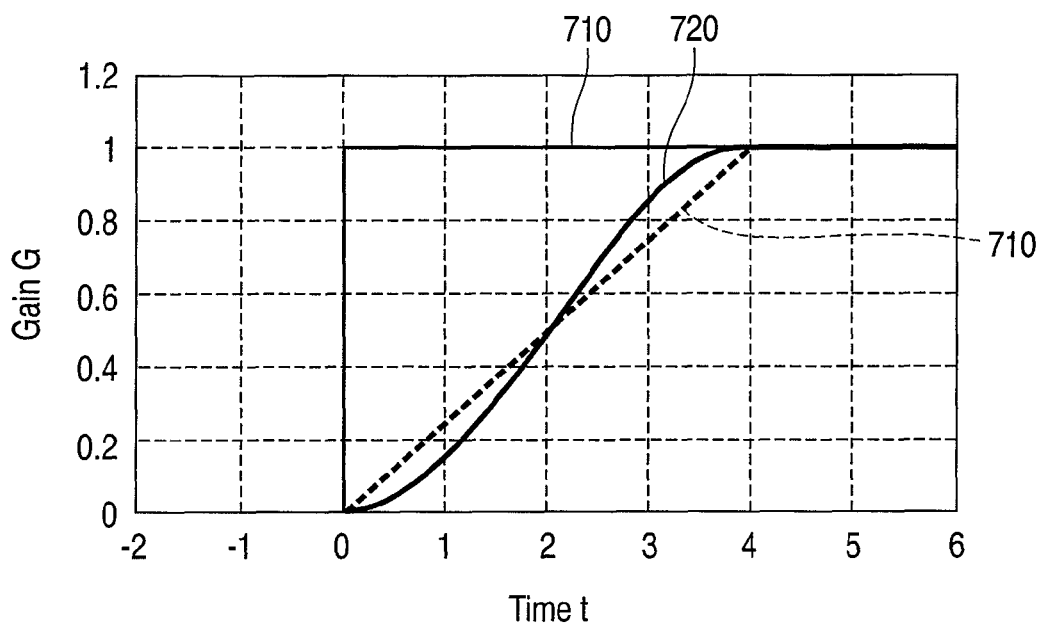
FIG. 7 is a diagram illustrating the gain characteristic observed in a servo control according to the embodiment.

FIG. 7 is a diagram illustrating the characteristic of the gain G set to the gain adjuster 143 in the present embodiment. FIG. 7 is based on the assumption that the gain G starts increasing at time t1 (=0) and stops increasing at time t2 (=4). Thus, time t1 and time t2 shall be called "gain increase start time" and "gain increase end time," respectively. The characteristic of gain G may be step-type gain characteristic 700, ramp-type gain characteristic 710, or sine ($\sin^2$)-type gain characteristic 720. The sine-type gain characteristic 720 utilizes a phase that ranges from 0 to $\pi/4$.

As described above, the virtual concentric servo control according to this embodiment can measure, with high precision, the disk runout (disk runout data δm), without impairing the operating reliability of the disk drive shipped from the manufacturer. Hence, if a disk shift outside the tolerance range is detected in the disk drive shipped, the CPU 14 may use the disk runout value measured (i.e., disk runout data δm stored in the memory), thereby performing dynamic offset control (particularly, WDOC).

The virtual concentric servo-control method according to this embodiment can apply the gain-controlled virtual target orbit Ur to the feedback control, thereby changing the target orbit r. Therefore, a reliable servo control can be achieved, without any phase delay.

In the virtual concentric servo-control method according to this embodiment, the disk runout controller 142 performs the feedforward control if disturbance dr is generated. The disk runout can therefore be measured more accurately than in the conventional servo-free method. In other words, the disk runout is measured while the servo control remains valid, accomplishing a practical and stable function of measuring the disk runout.

In the virtual concentric servo-control method according to this embodiment, the actuator 3 is, of course, not pushed onto the stopper. Therefore, fine dust particles would not be generated to cause contamination in the disk drive.

Examples of the Embodiment

Examples of disk drives using the virtual concentric servo-control method according to this embodiment will be described below, with reference to FIGS. 8 to 16.

Figure 8:
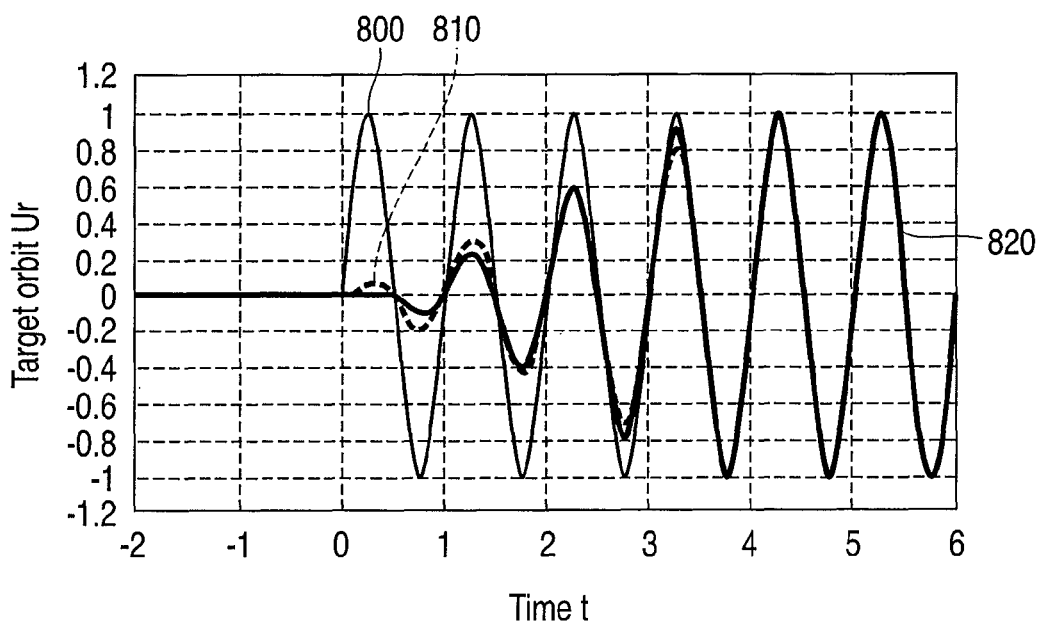
FIG. 8 is a diagram illustrating the characteristic of a virtual target orbit set in the servo control according to the embodiment.
Figure 9:
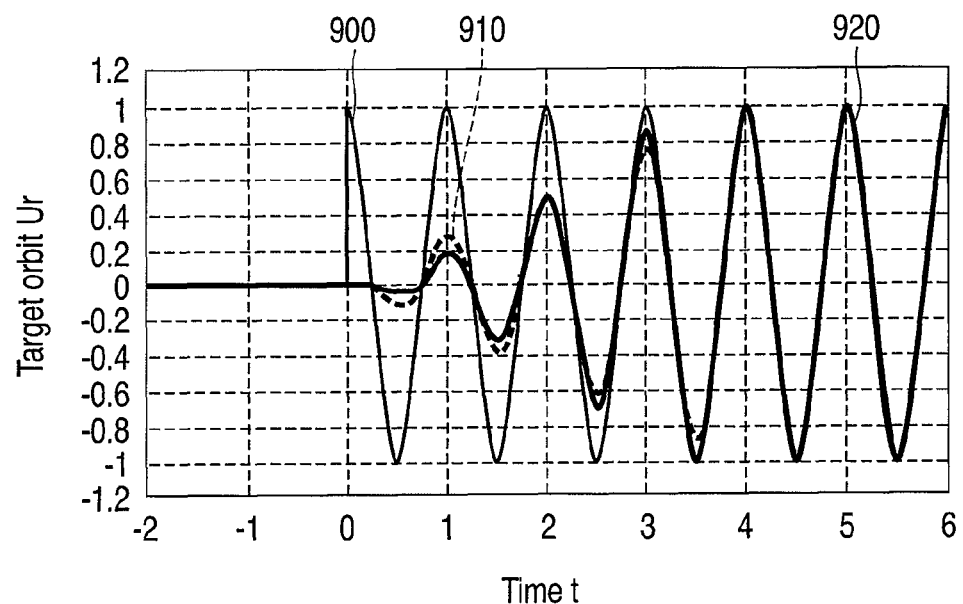
FIG. 9 is a diagram illustrating the characteristic of a virtual target orbit set in the servo control according to the embodiment.

FIGS. 8 and 9 are diagrams illustrating the characteristics of a virtual target orbit Ur. These characteristics pertain to a virtual target orbit value multiplied by gain G, which is 0 immediately after the virtual concentric servo control has been started, and is 1 some time thereafter. The virtual target orbit Ur is based on the primary component, i.e., runout of the disk 1, and exhibits characteristics pertaining to the product a first-order sine wave and gain G.

FIG. 8 is concerned with the case where the first-order sine wave has a start phase of 0°, and shows step-type characteristic 800, ramp-type characteristic 810, or sine-type characteristic 820. With this step-type characteristic 810, the virtual target orbit Ur has sine-wave amplitude that gradually increases. FIG. 9 illustrates the characteristics the virtual target orbit Ur has if the first-order sine wave has a start phase of 90°, and shows step-type characteristic 900, ramp-type characteristic 910, or sine-type characteristic 920. With the ramp-type gain characteristic 910, the virtual target orbit Ur has sine-wave amplitude that gradually increases, in the same way as shown in FIG. 8. In this case, the phase shifts because the timing of validating the virtual target orbit Ur and the timing of updating the virtual target orbit Ur are random. Hereinafter, the phase of the first-order sine wave will be referred to as "start phase."

Figure 10:
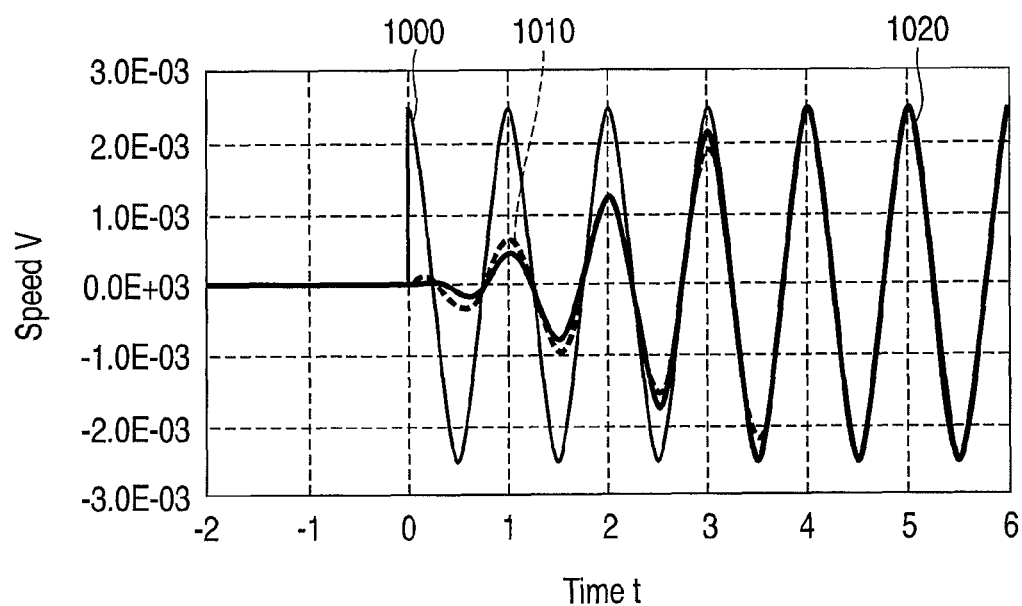
FIG. 10 is a diagram showing a speed characteristic observed in the servo control according to the embodiment.

FIGS. 10 to 12 are diagrams showing the speed characteristics observed when the virtual target orbit Ur is applied to the feedback control. More specifically, FIG. 10 shows how speed V changes if the first-order sine wave has start phase of 0°, and also shows step-type characteristic 1000, ramp-type characteristic 1010 and sine-type characteristic 1020. FIG. 11 shows the case where the first-order sine wave has start phase of 90°, and also shows step-type characteristic 1100, ramp-type characteristic 1110 and sine-type characteristic 1120. As the step-type characteristic 1100 indicates in FIG. 11, the speed V abruptly changes at gain start time t1 (=0).

FIG. 12 shows the speed characteristic observed at gain start time t1 (=0) if the virtual target orbit Ur is applied to the feedback control. In other words, FIG. 12 shows the speed characteristic observed at gain start time t1 (=0) if the phase (start phase) of the first-order sine wave is changed from 0° to 360°. As the step-type characteristic 1200 indicates, the speed V abruptly changes because of the start phase. As the ramp-type characteristic 1210 and sine-type characteristic 1220 indicate, the speed V does not abruptly changes.

In the examples described above, the ramp-type characteristic gently changes in both position and speed, from the gain start time t1 (=0) on. No abrupt changes of this characteristic are observed at any start phase. If the disk 1 has runout of 40 $um_{0-P}$ when secured to the SPM 2, a reliable virtual concentric servo control can be achieved, ensuring servo control at all times, if the ramp-type gain characteristic is applied.

The examples described above utilize the virtual concentric servo-control method designed to ensure the continuity of position and speed. FIGS. 13 to 16 show examples that use a virtual concentric servo-control method designed to ensure the continuity of acceleration A, too. In these examples, a sinusoidal gain characteristic is applied to change the target orbit r stably in a short time.

FIG. 13 shows the characteristic of acceleration A, observed if the virtual target orbit Ur is applied to the feedback control, and illustrates ramp-type characteristic 1310 and sine-type characteristic 1320, if the first-order sine wave has a start phase of 0°. On the other hand, FIG. 14 shows ramp-type characteristic 1410 and sine-type characteristic 1420, which are observed if the first-order sine wave has a start phase of 90°. As seen from in FIG. 14, the acceleration A abruptly changes for the ramp-type characteristic 1410, during the period from the gain start time t1 (=0) to the gain end time t2 (=4).

Figure 15:
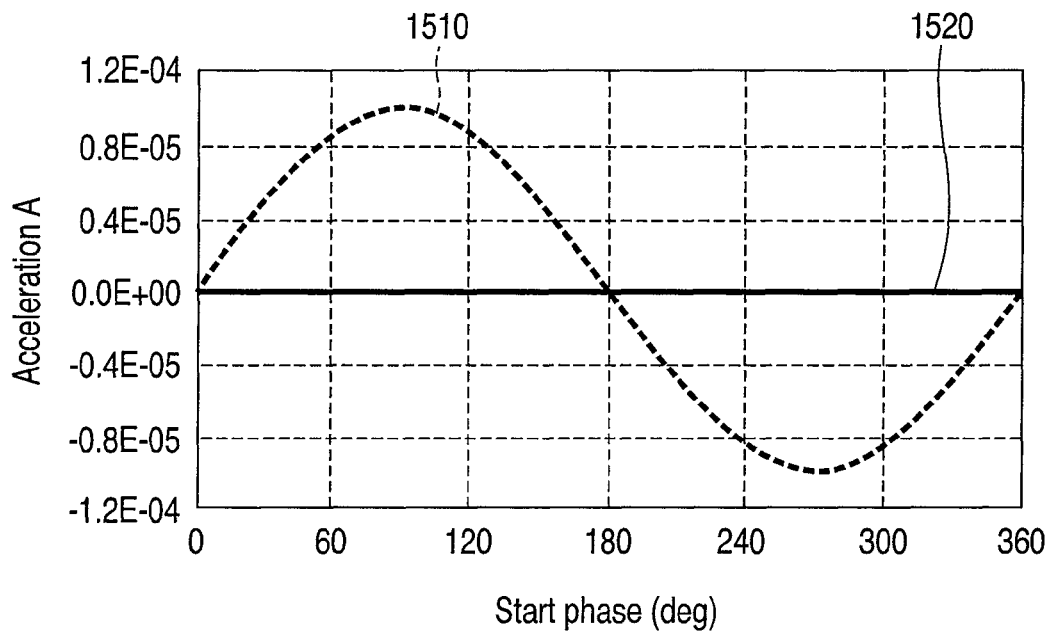
FIG. 15 is a diagram showing still another acceleration characteristic observed in the servo control according to the embodiment.

FIG. 15 shows the acceleration characteristic observed at the gain start time t1 (=0) if the phase of the first-order sine wave (i.e., start phase) is changed from 0° to 360° when the virtual target orbit Ur is applied to the feedback control. As seen from FIG. 15, the acceleration A abruptly changes in ramp-type characteristic 1510, and does not abruptly change, even at the start phase, in the sine-type characteristic 1520.

Figure 16:
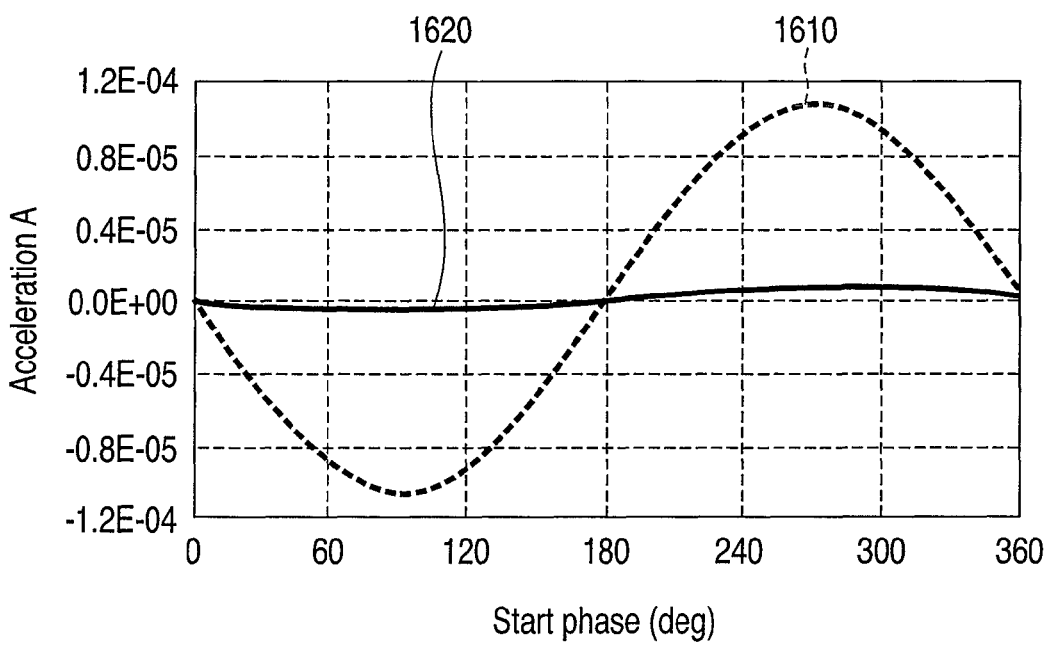
FIG. 16 is a diagram showing a further acceleration characteristic observed in the servo control according to the embodiment.

FIG. 16 shows the acceleration the characteristic observed at the gain end time t2 (=4) if the phase of the first-order sine wave (i.e., start phase) is changed from 0° to 360° when the virtual target orbit Ur is applied to the feedback control. As seen from FIG. 16, the acceleration A abruptly changes in ramp-type characteristic 1610 in the same way as shown in FIG. 15, and also the start phase in the sine-type characteristic 1620.

In view of the specific examples described above, the sign-type characteristic is applied, because the acceleration A changes more smoothly than in the ramp-type characteristic, during the period from the gain start and gain end of the virtual target orbit Ur. Therefore, the target orbit r can be stably changed in a shorter time than in the case using the ramp-type characteristic. Since the sign-type characteristic is applied based on the assumption that the disk 1 has runout of 40 $um_{0-P}$ when secured to the SPM 2, the servo control can be switched to the virtual concentric servo control, more quickly and reliably than in the case using the ramp-type characteristic. The reliable virtual concentric servo control can measure the disk runout with high precision, without impairing the reliability of the disk drive.

In the examples described above, only the primary component of disk runout is taken into account. Nonetheless, the secondary component and other lower-order components may be used, too, to change the target obit r as stably as in the case where only the primary component is utilized. Moreover, the target orbit r can be stably changed if a tank-type function or a difference function is used in place of the sine-type characteristic.

The various modules of the systems described herein can be implemented as software applications, hardware and/or software modules, or components on one or more computers, such as servers. While the various modules are illustrated separately, they may share some or all of the same underlying logic or code. While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A disk drive comprising:
    an actuator configured to move a head over a disk in a radial direction thereof;
    a servo controller configured to control the head to follow a target orbit on the disk, in accordance with a control value for the actuator;
    a calculation module configured to receive the control value from the servo controller and to calculate, as a disk runout value, a virtual target orbit value to be supplied to the servo controller in order to suppress a disturbance at the target orbit, in measuring a disk runout of the disk, the virtual target orbit value being calculated when the control value is substantially equal to zero; and
    an adjustment module configured to multiply the virtual target orbit value by a preset gain, and to input the virtual target orbit value to the servo controller without changing a phase of the virtual target orbit, wherein the adjustment module comprises a gain changing module configured to change the gain to 1 upon lapse of a threshold time after the servo controller has been activated.

2. The disk drive of claim 1, wherein
    the servo controller comprises:
    a feedback controller configured to calculate the control value for the actuator based on a positioning error of the head with respect to the target orbit; and
    a feedforward controller comprising the calculation module and the adjustment module, and
    the adjustment module is configured to input the control value in order to suppress the disturbance applied to the feedback controller.

3. The disk drive of claim 1, wherein the calculation module is configured to calculate the virtual target orbit value for suppressing the disturbance when the head moves to a first position on the disk in order to measure the disk runout.

4. The disk drive of claim 1, wherein the calculation module is configured to receive from the servo controller the control value in accordance with the disk runout and to calculate the virtual target orbit value for compensating the disk runout, on the basis of a preset transfer characteristic.

5. The disk drive of claim 1, wherein the servo controller is configured to receive the virtual target orbit value from the calculation module and to converge the control value to zero by a feedback control.

6. A disk drive comprising:
    an actuator configured to move a head over a disk in a radial direction thereof;
    a servo controller configured to control the head to follow a target orbit on the disk, in accordance with a control value for the actuator;
    a calculation module configured to receive the control value from the servo controller and to calculate, as a disk runout value, a virtual target orbit value to be supplied to the servo controller in order to suppress a disturbance at the target orbit, in measuring a disk runout of the disk, the virtual target orbit value being calculated when the control value is substantially equal to zero;
    an adjustment module configured to multiply the virtual target orbit value by a preset gain, and to input the virtual target orbit value to the servo controller without changing a phase of the virtual target orbit; and
    a detection module configured to detect a disk shift by using the disk runout value calculated by the calculation module.

7. The disk drive of claim 6, wherein
    the servo controller comprises:
    a feedback controller configured to calculate the control value for the actuator based on a positioning error of the head with respect to the target orbit; and
    a feedforward controller comprising the calculation module and the adjustment module, and
    the adjustment module is configured to input the control value in order to suppress the disturbance applied to the feedback controller.

8. The disk drive of claim 6, wherein the calculation module is configured to calculate the virtual target orbit value for suppressing the disturbance when the head moves to a first position on the disk in order to measure the disk runout.

9. The disk drive of claim 6, wherein the calculation module is configured to receive from the servo controller the control value in accordance with the disk runout and to calculate the virtual target orbit value for compensating the disk runout, on the basis of a preset transfer characteristic.

10. The disk drive of claim 6, wherein the servo controller is configured to receive the virtual target orbit value from the calculation module and to converge the control value to zero by a feedback control.

11. A servo control method for use in a disk drive comprising a servo controller configured to feedback control a head to follow a target orbit on a disk, in accordance with a control value for an actuator, the method comprising:
    receiving the control value from the servo controller;
    calculating, as a disk runout value, a virtual target orbit value to be supplied to the servo controller in order to suppress a disturbance at the target orbit, in measuring a disk runout of the disk, the virtual target orbit value being calculated when the control value is substantially equal to zero;
    multiplying the virtual target orbit value by a preset gain, and inputting the virtual target orbit value to the servo controller without changing a phase of the virtual target orbit; and
    changing the gain to 1 upon lapse of a threshold time after the servo controller has been activated.

12. The servo control method of claim 11, further comprising:
calculating the control value for the actuator based on a positioning error of the head with respect to the target orbit; and
inputting the control value in order to suppress the disturbance applied to a feedback controller.

13. The servo control method of claim 11, further comprising calculating the virtual target orbit value for suppressing the disturbance when the head moves to a first position on the disk in order to measure the disk runout.

14. The servo control method of claim 11, further comprising:
receiving from the servo controller the control value in accordance with the disk runout; and
calculating the virtual target orbit value for compensating the disk runout, on the basis of a preset transfer characteristic.

15. The servo control method of claim 11, further comprising:
receiving the virtual target orbit value; and
converging the control value to zero by a feedback control.

16. A servo control method for use in a disk drive comprising a servo controller configured to feedback control a head to follow a target orbit on a disk, in accordance with a control value for an actuator, the method comprising:
receiving the control value from the servo controller;
calculating, as a disk runout value, a virtual target orbit value to be supplied to the servo controller in order to suppress a disturbance at the target orbit, in measuring a disk runout of the disk the virtual target orbit value being calculated when the control value is substantially equal to zero;
multiplying the virtual target orbit value by a preset gain, and inputting the virtual target orbit value to the servo controller without changing a phase of the virtual target orbit; and
detecting a disk shift by using the calculated disk runout value.

17. The servo control method of claim 16, further comprising:
calculating the control value for the actuator based on a positioning error of the head with respect to the target orbit; and
inputting the control value in order to suppress the disturbance applied to a feedback controller.

18. The servo control method of claim 16, further comprising calculating the virtual target orbit value for suppressing the disturbance when the head moves to a first position on the disk in order to measure the disk runout.

19. The servo control method of claim 16, further comprising:
receiving from the servo controller the control value in accordance with the disk runout; and
calculating the virtual target orbit value for compensating the disk runout, on the basis of a preset transfer characteristic.

20. The servo control method of claim 16, further comprising:
receiving the virtual target orbit value; and
converging the control value to zero by a feedback control.

* * * * *